United States Patent
Sulzyc et al.

(10) Patent No.: US 6,840,279 B2
(45) Date of Patent: Jan. 11, 2005

(54) PNEUMATIC SWITCHING VALVE FOR SYSTEMS FOR LIFTING AND LOWERING THE BODY OF VEHICLES INCLUDING AIR SUSPENSION

(75) Inventors: Georg Sulzyc, Eppelheim (DE); Roland Blanz, Heiligkreuzsteinach (DE)

(73) Assignee: Haldex Brake Products GmbH, Heidelberg (DE)

(*) Notice: Subject to any disclaimer, the term of this patent is extended or adjusted under 35 U.S.C. 154(b) by 70 days.

(21) Appl. No.: 10/172,285

(22) Filed: Jun. 14, 2002

(65) Prior Publication Data

US 2003/0000587 A1 Jan. 2, 2003

(30) Foreign Application Priority Data

Jun. 16, 2001 (DE) .......................................... 101 29 143

(51) Int. Cl.[7] .................... B60G 17/005; B60G 17/056; F16K 11/10; F16K 11/16
(52) U.S. Cl. .................... 137/636.1; 137/595; 137/596; 137/596.2; 251/14; 251/263; 280/5.503; 280/5.504; 280/5.514; 280/6.157; 280/6.159; 280/124.102; 280/124.157; 280/124.16; 280/DIG. 1
(58) Field of Search ................................. 137/595, 636, 137/636.1, 636.2, 596, 596.2; 280/6.15, 6.159, 6.16, 124.1, 124.157, 124.158, 124.159, 124.16, DIG. 1, 5.503, 5.504, 5.505, 5.507, 5.514, 6.157, 6.158, 124.102; 251/14, 251, 263; 267/64.11, 64.16

(56) References Cited

U.S. PATENT DOCUMENTS

| | | | | |
|---|---|---|---|---|
| 1,326,247 A | * | 12/1919 | Zengel ...................... | 137/636.1 |
| 1,371,795 A | * | 3/1921 | Logan ...................... | 137/636.1 |
| 2,616,710 A | * | 11/1952 | Woodruff .................. | 137/636.1 |
| 3,140,725 A | * | 7/1964 | Alfieri ...................... | 137/636.1 |
| 3,490,495 A | * | 1/1970 | Green ....................... | 137/636.1 |
| 3,601,153 A | * | 8/1971 | Page et al. ................. | 137/596.2 |
| 3,659,870 A | * | 5/1972 | Okuyama ................. | 137/636.1 |
| 3,831,968 A | * | 8/1974 | Shaffer ..................... | 267/64.16 |
| 4,377,299 A | * | 3/1983 | Fujii ........................ | 280/6.158 |
| 4,508,143 A | * | 4/1985 | Ogasawara ............... | 137/636.1 |
| 5,305,782 A | * | 4/1994 | Kipling et al. ............. | 137/596 |

FOREIGN PATENT DOCUMENTS

| | | |
|---|---|---|
| DE | 2510954 | 9/1976 |
| DE | 2623235 | 10/1978 |
| DE | 4120824 C1 | 6/1992 |
| EP | 0520148 B1 | 3/1998 |
| GB | 1559681 A | 1/1980 |

* cited by examiner

*Primary Examiner*—George L. Walton
(74) *Attorney, Agent, or Firm*—Thomas, Kayden, Horstemeyer & Risley, LLP (57) ABSTRACT

A pneumatic switching valve (1) for systems for lifting and lowering the body of a vehicle including air suspension includes a mechanical actuation element (33) for adjusting a lifting position, a lowering position, a driving position and a stop position associated with respective positions of the vehicle. An inlet valve (11), an outlet valve (12) and a locking valve (13) each include a valve body (24), a tappet (26) and a closing spring (27). The inlet valve (11) and the outlet valve (12) are arranged in one common plane to face in opposite directions. The closing springs (27) of the inlet valve (11) and of the outlet valve (12) also serve to move the actuation element (33) from the lifting position or from the lowering position to the stop position when the operator releases the actuation element (33). A control piston (6) having an axis perpendicular to and spaced apart from the axes of the inlet valve (11) and of the outlet valve (12) includes a plurality of cam surfaces (8; 9; 10) for actuating the valve bodies (24) of the inlet valve (11), the outlet valve (12) and the locking valve (13). The control piston (6) is subjected to compressed air to move the switching valve (1) from the stop position to the driving position. The control piston (6) is designed and arranged to be rotated from the stop position to the lifting position or to the lowering position.

20 Claims, 4 Drawing Sheets

PNEUMATIC SWITCHING VALVE FOR SYSTEMS FOR LIFTING AND LOWERING THE BODY OF VEHICLES INCLUDING AIR SUSPENSION

CROSS REFERENCE TO RELATED APPLICATIONS

This application claims priority to co-pending German Patent Application No. 101 29 143.4-21 entitled "Pneumatisches Schaltventil für Anlagen zum Heben und Senken des Fahrzeugaufbaus von luftgefederten Fahrzeugen", filed Jun. 16, 2001.

FIELD OF THE INVENTION

The present invention generally relates to a pneumatic switching valve for systems for lifting and lowering the body of a vehicle including air suspension, for example a truck. Such a pneumatic switching valve is manually actuated during container operation to carry a load on the vehicle, to cooperate the position of the body of the vehicle with the position of a loading platform and the like. The switching valve is designed to be mechanically controllable, and it may be pneumatically moved from the stop position to reach the driving position. The switching valve includes an actuation element usually being designed as a turning handle or a turning button being designed and arranged to fulfill a translatory axial movement in addition to its rotational movement. The switching valve is also active when driving the vehicle. When driving the vehicle, the switching valve has its driving position such that undesired lifting and lowering of the body of the vehicle during driving is prevented. However, the switching valve may be used with in combination with a leveling valve being located in a conduit being connected to the air suspension bellows to achieve a leveling effect.

BACKGROUND OF THE INVENTION

A pneumatic switching valve is known from German Patent No. 41 20 824 C1 corresponding to European Patent No. EP 0 520 148 B1. The known switching valve includes a control piston having a cam surface with which the tappet of a locking valve may be actuated by axial displacement of the control piston. In this way, it is possible to switch from the stop position to reach the driving position and vice versa when driving the vehicle. Cam discs are axially displaceable together with the control piston, but they are coupled thereto to be commonly rotated. The cam discs include cam surfaces for actuating an inlet valve and an outlet valve. There are three valves—namely an inlet valve, an outlet valve and a locking valve—for each air suspension circuit. As another component, a bush is associated with the control piston, the bush being fixedly connected to the control piston and to the actuation element to be commonly rotated therewith. The arrangement of the bush and of the cam disc for the inlet valves and for the outlet valves have the effect that the design and construction of the known switching valve are rather complicated. Furthermore, there is a separate spring unit having an effect on the bush and on the control piston by the bush to cause an automatic returning movement from the lifting position (or from the lowering position) to reach the stop position as soon as the actuation element is released by the operator, as it is common after having finished a lifting process or a lowering process. The spring unit also makes the structure more complicated. The axes of the three valves serving for an air suspension circuit are located in one common plane intersecting with the axis of the switching valve and of the switching piston, respectively. In this way, the groups of valves for a plurality of air suspension circuits may be distributed about the circumference. Furthermore, there is a locking unit for preventing rotational movement of the switching piston in the driving position. The control piston is arranged in the housing of the switching valve to be axially movable by compressed air—especially by pulses of compressed air—to ensure that the driving position of the switching valve is maintained during driving the vehicle. It is a disadvantage of the known switching valve that the spring unit for returning the control piston to reach the stop position is rather complicated, and that the control piston has the described two-part design including the switching shaft and the bush. Additionally, realizing the cam surfaces at separate individual cam discs being arranged not to be rotatable and axially displaceable on the control piston is a substantial structural expenditure.

Another pneumatic switching valve is known from German Patent No. 26 23 235 C3. The known control unit is designed to be manually operable, and it includes a mechanical actuation element including a switching shaft and an actuation lever. The switching shaft may be pivoted about its axis by the actuation lever to reach five different angle positions including the stop position twice. The known switching valve includes cam discs being located on the switching shaft, the cam discs for each air suspension circuit actuating an inlet valve, an outlet valve and a locking valve. These three valves are arranged in a disc-like housing. The axes of the valves are located in one common plane perpendicular to the axis of the switching valve. In this way, the valves may also have a structure to serve for two or more air suspension circuits in an easy way. There are special catching units for the five positions such that partly automatic actuation is not possible. Proper actuation depends on the consciousness of the person actuating the switching valve. In this way, it is possible that the valve after having finished the loading operation does not automatically take the driving position.

Another switching valve is known from German Patent Application No. 25 10 954 A1. The switching valve has the positions "lifting", "lowering", "driving" and "stop". The valves being associated with the separate air suspension circuits are not designed to include tappets, but they instead have a valve stem design. The known switching valve includes a separate control piston which may be subjected to compressed air such that the switching valve may take the driving position due to the compressed air. The two stems of the valve with their axes are designed to be parallel with respect to each other. There are return springs for the stem elements, the springs serving to return the switching valve to reach the stop position as soon as the mechanical actuation element is released.

SUMMARY OF THE INVENTION

The present invention relates to a pneumatic switching valve for systems for lifting and lowering the body of a vehicle including air suspension. The switching valve includes a mechanical actuation element being designed and arranged to adjust a lifting position, a lowering position, a driving position and a stop position. At least one inlet valve having an axis includes a valve body, a tappet and a closing spring. At least one outlet valve having an axis and includes a valve body, a tappet and a closing spring. The inlet valve and the outlet valve are arranged in one common plane to face in opposite directions. The closing springs of the inlet valve and of the outlet valve are designed and arranged to move the actuation element from the lifting position and from the lowering position to the stop position when releasing the actuation element. At least one locking valve includes a valve body and a tappet. A control piston having an axis perpendicular to and spaced apart from the axes of the inlet valve and of the outlet valve includes a plurality of cam surfaces being designed and arranged to actuate the valve bodies of the inlet valve, the outlet valve and the locking valve. The control piston is designed and arranged to be subjected to compressed air to move the switching valve from the stop position to the driving position. The control piston is designed and arranged to be rotated from the lifting position and from the lowering position to the stop position.

The novel switching valve does no longer have the known complicated structure of known switching valves including a switching shaft, a bush and a plurality of cam discs. Instead, the cam surfaces of the novel valve are directly located at the control piston. Thus, realizing a one-piece structure is possible. However, it is also possible to fixedly interconnect a plurality of elements to form one unit to be supported in the housing of the switching valve to be moved in an axial direction, to be rotated and to be locked in a special way. Still realizing the possibility of axial displacement, some fixed connections between separate elements are no longer required. The known additional spring unit for returning the actuation element from the lifting position or from the lowering position to reach the stop position is not necessarily required. The respective function is fulfilled by closing springs of the inlet valve and of the outlet valve.

The valves are designed to include tappets, meaning each valve includes a valve body and a tappet. The valve body with a rim being connected to the housing forms a valve as it is known from the design of check valves. The valve body is supported on a closing spring, as this is also known from the design of check valves. The tappet and the valve body of each valve may be designed as one piece, but they may also be designed as a plurality of pieces. The closing springs of the inlet valve and of the outlet valve do not only fulfill the closing function of these valves, but also the return function during container operation to reach the stop position of the switching valve. For this purpose, the closing springs preferably are designed to be stronger as it is the case with closing springs in check valves which only have to fulfill the closing function.

The inlet valve and the outlet valve are designed in one common plane in opposite directions, the plane being located to be perpendicular with respect to the axis of the control piston or the switching piston. To allow for sufficient lever arms for transmitting the return force and return torque, respectively, to the switching piston, the axes of the inlet valve and of the outlet valve are arranged at a distance with respect to the axis of the control piston. The distance then forms the lever arm during force transmittance. The axes of the two valves and the axis of the switching piston do not intersect. The locking valve with its axis may be arranged such that its axis intersects with the axis of the control piston. The locking valve does apply a return force to the control piston.

In an especially preferred exemplary embodiment, the novel control piston may include a cam element protruding in a radial direction. The cam element includes the cam surfaces serving for actuation of the inlet valve and of the outlet valve in opposite directions. The inlet valve and the outlet valve with their axes are designed to be aligned. The cam protruding in a radial direction has a nose-like design, and it includes the two cam surfaces for actuating the inlet valve and the outlet valve in opposite directions at its right side and at its left side. The cam element protruding in a radial direction also forms the lever arm for transmitting a return moment by the closing springs after releasing the actuation element from the lifting position or the lowering position. There also is the possibility of arranging the locking valve such that its axis is located in the common plane in a way that all elements for one air suspension circuit are arranged in a comparatively flat disc. To realize a multi-circuit design, a plurality of such discs may be arranged one above the other.

In another preferred exemplary embodiment, the control piston includes two cam elements protruding in a radial direction. The two cam elements include the cam surfaces for actuating the inlet valve and the outlet valve in opposite senses of direction. The inlet valve and the outlet valve with their axes are arranged to be parallel. The two cam elements protruding in a radial direction preferably form a movable beam. The movement of the movable beam in opposite directions moves the valve tappets of the two valves in opposite directions. The return forces are respectively transmitted in opposite directions. In such an arrangement, the axes of the inlet valve and of the outlet valve are arranged to be parallel with respect to one another and at a distance with respect to one another. The distance with respect to the axis of the switching piston preferably is the same for both valves.

Preferably, the actuation element and the control piston may be fixedly connected with each other such that they form a unit to be commonly rotated and to be commonly moved in an axial direction. Manual adjustment between the driving position and the stop position is conducted by an axial displacement of the unit, while the lifting position and the lowering position may be reached from the stop position by a turning movement of the unit. With this fixed connection between the actuation element and the control unit, it is not necessary to arrange sliding fitting elements allowing for axial movability and maintaining the fixed connection.

The rotatability or turnability of the control piston preferably is limited by stop elements. Such an arrangement is especially advantageous to prevent continuous rotation of the control piston causing uncontrolled actuation of the inlet valve and of the outlet valve. The cam surface serving to actuate the locking valve may extend over the angle of rotation being limited by the stops. However, this is not necessary.

It is advantageous to chose a design in which the cam surfaces of the control piston being associated with the inlet valve and the outlet valve are designed such that there is no contact to the tappets of the inlet valve and of the outlet valve in the driving position. In this way, it is ensured that the inlet valve and the outlet valve reliably reach their closing position, and that they maintain their closing position. The closing forces effected by the closing springs are only transmitted to the valve bodies, and they are not supported at the control piston by the tappets. It is to be understood that the play is chosen to be relatively small for this purpose and for effect a lifting movement or a lowering movement already at the beginning of a rotational movement of the control piston during container operation.

Furthermore, there is the possibility of designing the cam surface of the control piston being associated with the locking valve in a way that there is no contact to the tappet of the locking valve in the positions "stop", "lifting" and "lowering". Such an arrangement makes sense to keep frictional forces which have to be overcome when turning the control piston as small as possible.

The cam surface of the control piston being associated with the locking valve may have such a design that the control piston is caught by and at the tappet of the locking valve in the driving position. The catching effect or locking effect or engaging effect is especially advantageous when pulses of compressed air are directed to the control piston in a timely spaced apart manner to automatically attain the driving position, and when it is nevertheless desired to prevent the control piston from leaving its driving position when driving the vehicle. On the other hand, during loading operation, it is possible to overcome the engagement of the control piston by manually applying an axial force, and thus to move the control piston first to reach the stop position, and to later start a lifting movement or a lowering movement.

The construction of the valves is especially simple when the inlet valve, the outlet valve and/or the locking valve are designed such that the respective tappet is fixedly connected to the respective valve body. Furthermore, there is the possibility of the inlet valve, the outlet valve and the locking valve having identical designs such that the valve bodies and the tappet elements are replaceable, and they may be used for each of the three valves, respectively.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
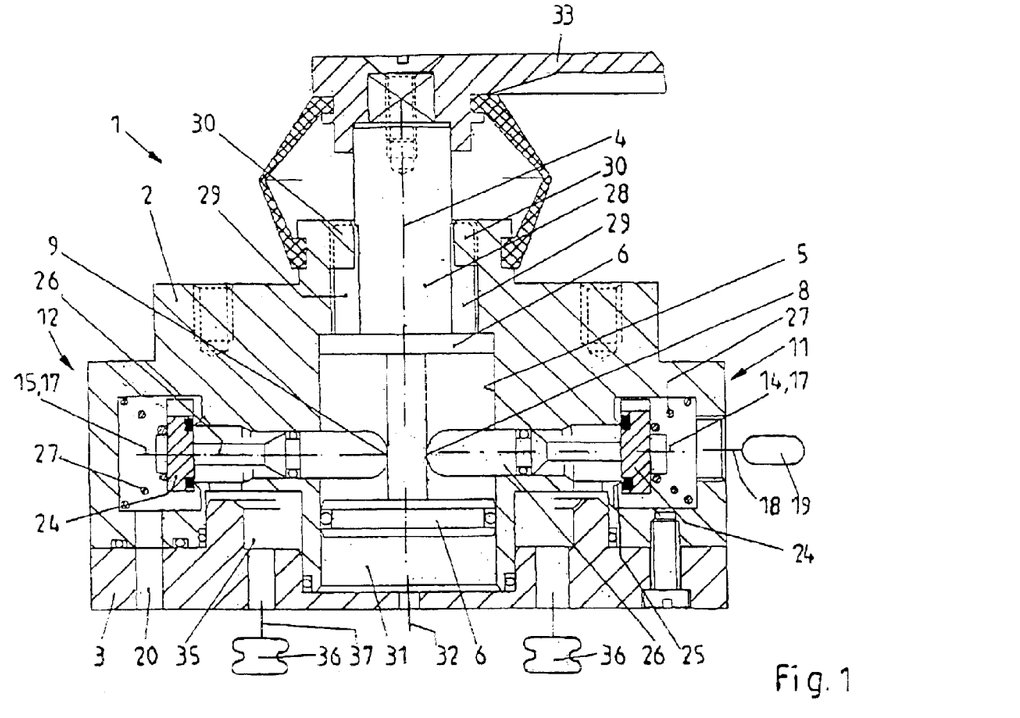
FIG. 1 is a vertical sectional view of a first exemplary embodiment of the novel switching valve.
Figure 2:
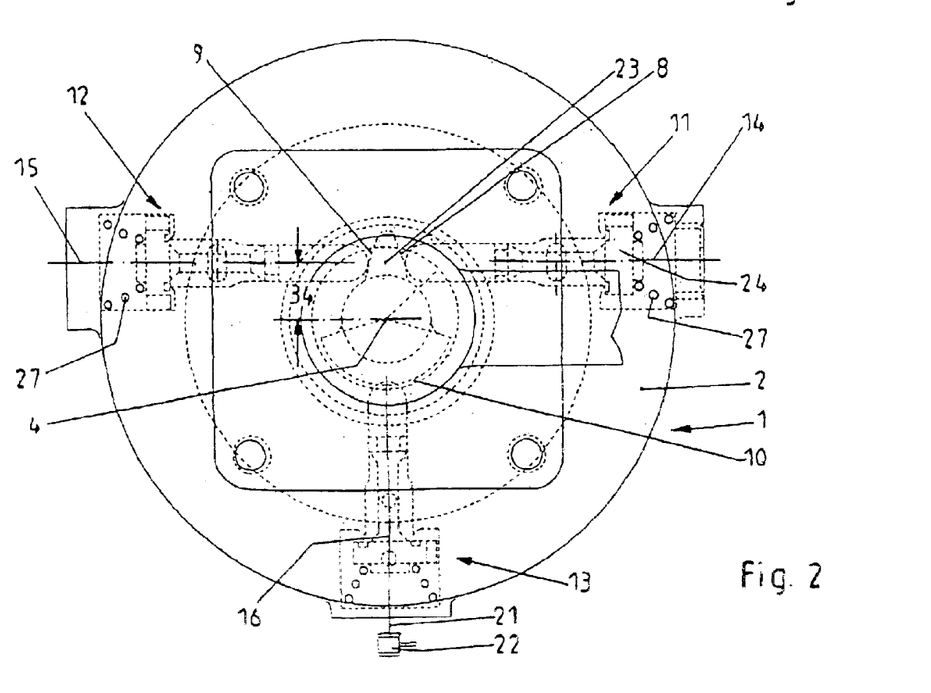
FIG. 2 is a top view of the novel switching valve according to FIG. 1.

Referring now in greater detail to the drawings, FIG. 1 illustrates a novel switching valve 1 including a housing 2. At its bottom side, the housing 2 is sealingly closed by a cover 3. The switching valve 1 has an axis 4. A cylindrical bore 5 is arranged to be concentric with respect to the axis 4 in the housing 2. A control piston 6 is designed and arranged to be movably and sealingly guided in the bore 5. The control piston 6 has a middle portion 7 including cam surfaces 8, 9, 10. The cam surface 8 serves to actuate an inlet valve 11. The cam surface 9 serves to actuate an outlet valve 12, and the cam surface 10 serves to actuate a locking valve 13. The inlet valve 11 has an axis 14. The outlet valve 12 has an axis 15, and the locking valve 13 has the axis 16 (FIG. 2). At least the axes 14 and 15 are arranged in one common plane 17. The plane 17 extends in a direction perpendicular to the axis 4 of the switching valve 1. The inlet valve 11 is supplied with compressed air coming from a reservoir 19 by a conduit 18. The outlet valve 15 includes a deaerating opening 20. A conduit 21 is connected to the locking valve 13, the conduit 21 coming from a leveling 22.

It is to be seen from FIG. 2 that the cam surfaces 8 and 9 are realized at one single cam element 23 protruding in a radial direction in the region of the center portion 7 of the control piston 6. The cam surface 10 being associated with the locking valve 13 is arranged at the other side of the axis 4 in the region of the center portion 7. The cam surfaces 8 and 9 have their effect by turning the control piston 6 about its axis 4. The cam surface 10 serves to axially displace the control piston 6 without simultaneous rotation.

It is to be seen from FIGS. 1 and 2 that the three valves—meaning the inlet valve 11, the outlet valve 12 and the locking valve 13—may have corresponding designs and structures. Each valve includes a valve body 24 which cooperates with a rim 25 being located at the housing 2. Furthermore, a tappet 26 is located in the region of each of the three valves 11, 12, 13. The tappet 26 may be fixedly connected to the respective valve body 24. However, it is also possible that the tappet 26 only contacts the respective valve body 24. Each of the three valves 11, 12, 13 also includes a closing spring 27. The valves 11, 12, 13 have designs similar to the ones of check valves.

The control piston in its upper portion (FIG. 1) includes a shaft 28. The shaft 28 may be designed as a separate element being fixedly connected to the other parts of the control piston 6 to be commonly rotated therewith, and to be axially displaced as one common structural unit. The shaft 28 at least includes one extension element 29 protruding in a radial direction. FIG. 1 illustrates two extension elements 29 being spaced apart by 180°. The housing 2 includes longitudinal slots 30 being associated with the extension elements 29. When the control piston 6 reaches the position "drive" (FIG. 1) coming from the position "stop", the extension elements 29 enter the longitudinal slots 30. In this way, a locking unit is formed, the locking unit being designed and arranged to prevent the control piston 6 from rotation to reach the position "drive".

The control piston 6 can only be moved from the position "stop" to reach the position "drive". For this purpose, the lower part of the bore 5 is designed as a control chamber 31 to which a conduit 32 is connected. Air may enter the control chamber 31 by the conduit 32 as desired. Such a pressure pulse may especially result from an antilock system when the vehicle starts moving and, for example, an adjustable speed limit has been exceeded. In this way, it is ensured that the position "drive" is securely reached even when the user of the vehicle has not moved the switching valve back to reach its driving position after having finished loading of the vehicle. In the driving position of the switching valve 1, the position of the body of the vehicle is controlled by the leveling valve 22.

An actuation element 33—preferably in form of a rotational lever or of a button—serves to manually operate the switching valve 1. The actuation element 33 is fixedly connected to the shaft 28 and to the control piston 6 to be commonly rotated therewith. The control piston 6, the rotating shaft 28 and the actuation element 33 form a fixed unit which may be designed and arranged to be displaced in an axial direction and to be rotated.

It is clear that the control piston 6 of the switching valve 1 can only be moved to reach the driving position coming from the stop position and vice versa. The change of position is realized by an axial displacement or movement of the control piston 6. This displacement may either be realized manually by hand by the actuation element 33, or pneumatically by aerating the control chamber 31. Pneumatic actuation usually only causes a change from the stop position to the driving position. However, there may also be means for the opposite change from the driving position to the stop position. The control piston in the position "stop" may reach the lifting position by exclusively rotating it in one sense of rotation, and it may reach the lowering position by exclusively rotating it in the opposite sense of rotation. This rotation is realized by manually operating the actuation element 33. After having released the actuation element 33 after having finished a lifting operation or a lowering operation, the closing springs 27 of the inlet valve 11 or of the outlet valve 12 move the control piston 6 back to reach the "stop" position. This movement is possible since the force of the closing springs 27 of the inlet valve 11 or of the outlet valve 12 is sufficient to attain respective torque acting upon the control piston 6. The aligned axes 14 and 15 of the inlet valve 11 and of the outlet valve 12 are arranged at a distance 34 with respect to one another, the distance 34 also being the lever arm for the torque of the force of one of the closing springs 27.

An annular space 25 may be located inside the housing 2 of the switching valve 1. The annular space 35 is connected to the inlet valve 11, the outlet valve 12 and the locking valve 13 at one side, and it is connected to at least one air suspension bellow 36 by a conduit 37 at is other side.

Figure 3:
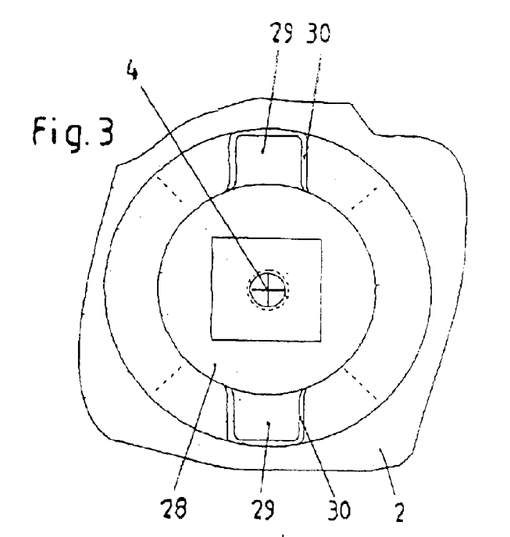
FIG. 3 is a detailed view of the switching valve in the region of the locking unit.

FIG. 3 clearly illustrates the design of the novel locking unit for preventing rotational movements in the driving position at an enlarged scale. FIG. 3 illustrates the shaft 28 with its two extension elements 29 engaging the longitudinal slots 30 located in the housing 2. This engagement position occurs in the driving position, meaning in the position illustrated in FIG. 1.

Figure 4:
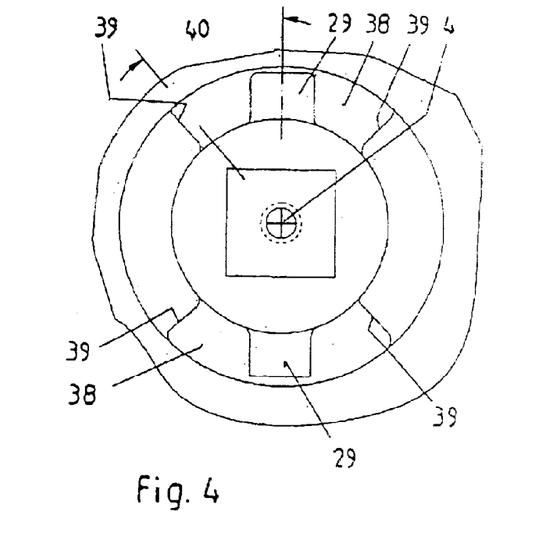
FIG. 4 is a detailed view in the region below the locking unit.

When the switching valve 1 has its stop position according to FIG. 4, the extension members 29 do not extend into the longitudinal slots (not illustrated). They are located in a portion of the housing 2 in which sector-like free spaces 38 are located. The spaces 38 are limited by shoulder elements 39 of the housing 2. Due to the design of the width of the extension elements 29 in combination with the arrangement of the shoulder elements 39, a turning angle 40 is determined with respect to the center position, the turning angle 40 illustrating the maximum rotation to the left or to the right. The maximum allowable rotation and the rotation angle 40, respectively, for reaching the lifting position equals the respective rotating angle towards the other side, meaning towards the lowering position. The rotating angle 40 is coordinated with the design of the cam 23 and the cam surfaces 8 and 9, respectively, such that the cam 23 still has its effect even during maximum rotation.

Figure 5:
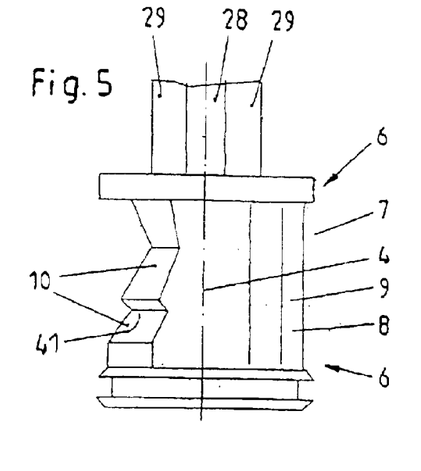
FIG. 5 is a detailed view of the control piston of the novel switching valve according to FIGS. 1–4.
Figure 6:
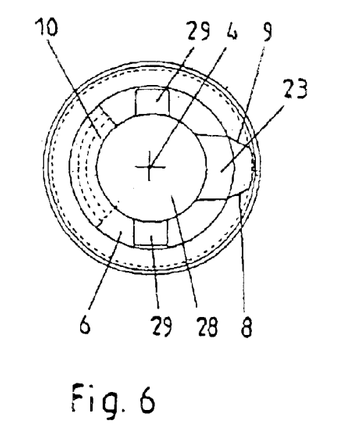
FIG. 6 is a top view of the control piston according to FIG. 5.

FIGS. 5 and 6 illustrate the design and arrangement of the cam surfaces 8, 9 and 10 in the middle portion 7 of the control piston 6 at greater detail. It is to be seen from FIG. 5 that the tappet 26 of the locking valve 13 may engage or catch an impression 41 being located in the cam surface 10 in the driving position. The engagement of the tappet 26 entering an impression secures the driving position such that the axial position of the control tappet 6 does not change even when there is no compressed air in the control chamber 31 and even when there are pushing movements and vibrations acting upon the switching valve 1 due to the driving movement of the vehicle. The impression 41 also defines a force threshold also being determined by the value of the force of the closing spring 27 of the locking valve 13. The force threshold is to be chosen in a way that it may be manually overcome during standstill of the vehicle at the beginning of loading of the vehicle. For this purpose, the actuation element 33 and the control piston 6 is to be moved from the driving position to reach the stop position, for example by pressing it in a downward direction.

Figure 7:
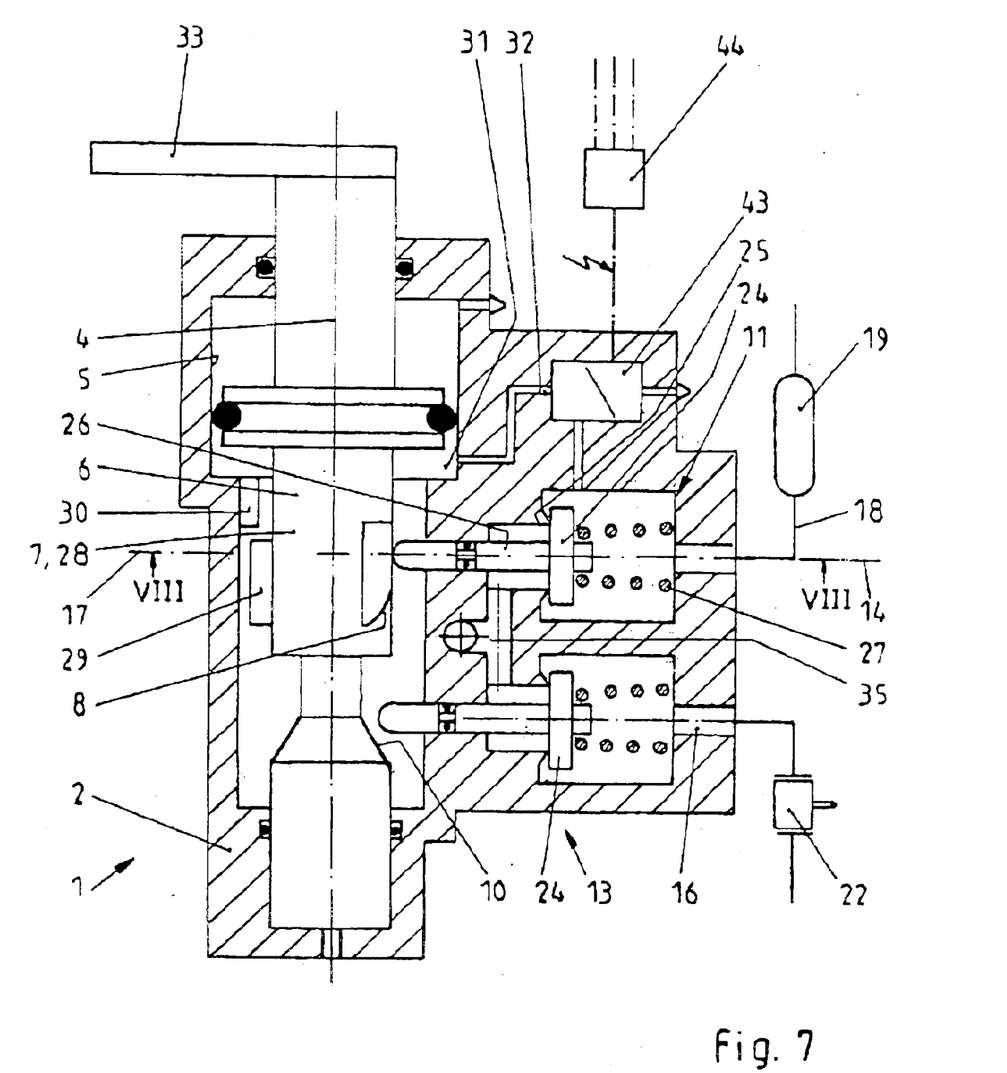
FIG. 7 is a vertical sectional view of a second exemplary embodiment of the novel switching valve.
Figure 8:
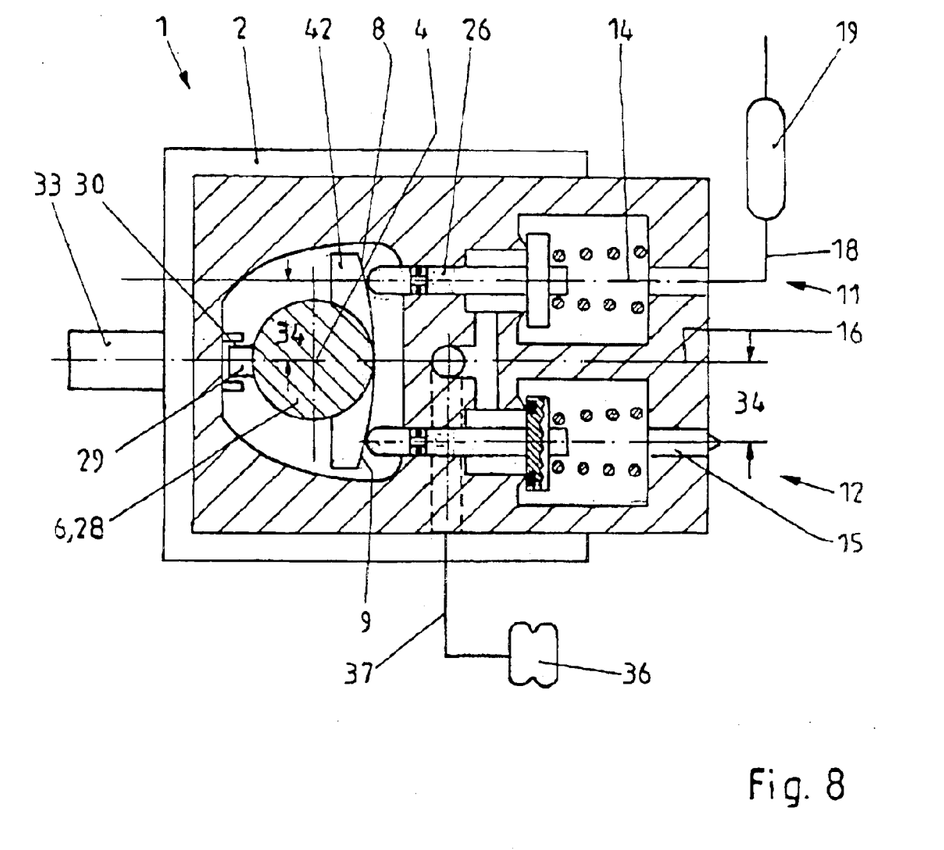
FIG. 8 is a sectional view along line VIII—VIII in FIG. 7.

FIGS. 7 and 8 illustrate a second exemplary embodiment of the novel switching valve 1. The illustrated embodiment of the novel switching valve 1 has some identical or similar elements compared to the above described embodiment. Therefore, it is referred to the above description. The axis 14 of the inlet valve 11 and the axis 15 of the outlet valve 12 are also located in the common plane 17 which also forms the plane of illustration of FIG. 8. The plane 17 extends in a perpendicular direction with respect to the axis 4 of the switching valve 1 and of the control piston 6, respectively. The inlet valve 11 and the outlet valve 12 with their axes 14 and 15 are arranged to be parallel with respect to each other at a distance 34 with respect to the axis 4. The locking valve 13 may be designed and arranged to be moved in an axial direction with respect to the plane 17.

Instead of one single cam protruding in a radial direction, the control piston 6 includes a bar 42 which forms two cams protruding in a radial direction. The cam surface 8 is located at one end, the cam surface 8 facing the inlet valve 11. The other end of the bar 42 includes the cam surface 9 being designed and determined to actuate the outlet valve 12. Again, the elements of the inlet valve 11 and of the outlet valve 12 are designed and arranged to move in opposite directions. Rotation of the bar 42 is limited by the design of the housing, and no additional elements are required for this purpose.

It is to be seen from FIG. 7 that a solenoid valve 43 may be arranged in the housing 2, the solenoid valve 43 being supplied with compressed air and allowing for aeration and deaeration, respectively, of the control chamber 31. The solenoid valve 43 may be preferably controlled by an electronic unit 44. Alternatively, the control chamber 31 may be located at a different position, for example below the control piston 6, as this is also indicated.

FIG. 7 illustrates the cam surfaces 8, 9, 10 having special designs, and that they are associated with the respective valves and their tappets 26, respectively. The design is chosen such that the tappet 26 of the locking valve 13 in the stop position (FIG. 7) does no longer contact the associated cam surface 10. Consequently, the rotational movement in the lifting position or in the lowering position is not negatively influenced by frictional engagement with the tappet 26 of the locking valve 13. On the other hand, it is ensured that the closing spring 27 of the locking valve 13 securely closes the locking valve 13 such that control movements of the leveling valve 22 have no influence. On the other hand, it is to be seen that in the driving position the tappet 26 of the inlet valve 11 and of the outlet valve 12 also do not contact their associated cam surfaces 8 and 9 such that the closing springs 27 of the inlet valve 11 and of the outlet valve 12 in the stop position are not supported on their associated cam surfaces 8 and 9 such that the closing function of these two valves in the stop position is ensured. The play or clearance existing between the cam surfaces 8 and 9 and the respective tappets 26 may be constructively chosen to be very small to promptly reach an aerating effect and a deaerating effect, respectively, when manually rotating the actuation element 33.

Many variations and modifications may be made to the preferred embodiments of the invention without departing substantially from the spirit and principles of the invention. All such modifications and variations are intended to be included herein within the scope of the present invention, as defined by the following claims.

We claim:

1. A pneumatic switching valve for systems for lifting and lowering the body of a vehicle including air suspension, comprising:

a mechanical actuation element being designed and arranged to adjust a lifting position, a lowering position, a driving position and a stop position;

at least one inlet valve having an axis and including a valve body, a tappet and a closing spring, said inlet valve axis extending beyond said inlet valve;

at least one outlet valve having an axis and including a valve body, a tappet and a closing spring, said outlet valve axis extending beyond said outlet valve, said inlet valve and said outlet valve being arranged in one common plane and to face in opposite directions, said closing springs of said inlet valve and of said outlet valve being designed and arranged to move said actuation element from the lifting position and from the lowering position to the stop position when releasing said actuation element;

at least one locking valve including a valve body and a tappet; and a control piston, said control piston having an axis perpendicular to and spaced apart from the axes of said inlet valve and of said outlet valve to form a distance, said control piston including a plurality of cam surfaces being designed and arranged to actuate said valve bodies of said inlet valve, said outlet valve and said locking valve, each of said cam surfaces and said distance forming a lever arm for transmitting a sufficient return force and a return torque from said closing springs of said inlet valve and of said outlet valve to said control piston to move the actuation element, said control piston being designed and arranged to be subjected to compressed air to move said switching valve from the stop position to the driving position, said control piston being designed and arranged to be rotated from the stop position to the lifting position or to the lowering position.

2. The switching valve of claim 1, wherein said control piston includes a cam element being designed and arranged to protrude in a radial direction, said cam element including a first cam surface and a second cam surface being designed and arranged to actuate said inlet valve and said outlet valve, the axes of said inlet valve and of said outlet valve being arranged to be aligned.

3. The switching valve of claim 1, wherein said control piston includes two cam elements being designed and arranged to protrude in a radial direction, said cam elements including a first cam surface and a second cam surface being designed and arranged to actuate said inlet valve and said outlet valve, the axes of said inlet valve and of said outlet valve being arranged to be parallel.

4. The switching valve of claim 1, wherein said actuation element is fixedly connected to said control piston.

5. The switching valve of claim 1, further comprising a plurality of stop elements being designed and arranged to limit the turnability of said control piston, said cam surface for actuating said locking valve extending over a turning angle being limited by said stop elements.

6. The switching valve of claim 2, further comprising a plurality of stop elements being designed and arranged to limit the turnability of said control piston, said cam surface for actuating said locking valve extending over a turning angle being limited by said stop elements.

7. The switching valve of claim 3, further comprising a plurality of stop elements being designed and arranged to limit the turnability of said control piston, said cam surface for actuating said locking valve extending over a turning angle being limited by said stop elements.

8. The switching valve of claim 4, further comprising a plurality of stop elements being designed and arranged to limit the turnability of said control piston, said cam surface for actuating said locking valve extending over a turning angle being limited by said stop elements.

9. The switching valve of claim 1, wherein said cam surface being associated with said inlet valve is designed and arranged not to contact said tappet of said inlet valve in the driving position, and wherein said cam surface being associated with said outlet valve is designed and arranged not to contact said tappet of said outlet valve in the driving position.

10. The switching valve of claim 1, wherein said cam surface being associated with said locking valve is designed and arranged not to contact said tappet of said locking valve in the stop position, in the lifting position and in the lowering position.

11. The switching valve of claim 10, wherein said cam surface being associated with said locking valve is designed and arranged such that said control piston catches said tappet of said locking valve in the driving position.

12. The switching valve of claim 1, wherein said valve body and said tappet of said inlet valve are fixedly interconnected, and wherein said valve body and said tappet of said outlet valve are fixedly interconnected.

13. The switching valve of claim 1, wherein said valve body and said tappet of said locking valve are fixedly interconnected.

14. The switching valve of claim 12, wherein said valve body and said tappet of said locking valve are fixedly interconnected.

15. The switching valve of claim 1, wherein said inlet valve, said outlet valve and said locking valve have approximately identical designs.

16. The switching valve of claim 1, further comprising a housing in which said inlet valve, said outlet valve, said locking valve and said control piston are arranged.

17. A pneumatic switching valve for systems for lifting and lowering the body of a vehicle including air suspension, comprising:

a mechanical actuation element being designed and arranged to adjust a lifting position, a lowering position, a driving position and a stop position of said switching valve;

at least one inlet valve having an axis and including a valve body, a tappet and a closing spring, said inlet valve axis continuing beyond said inlet valve;

at least one outlet valve having an axis and including a valve body, a tappet and a closing spring, said outlet valve axis continuing beyond said outlet valve, said closing springs of said inlet valve and of said outlet valve being designed and arranged to automatically move said switching valve from the lifting position to the stop position after releasing said actuation element, said closing springs of said inlet valve and of said outlet valve being designed and arranged to automatically move said switching valve from the lowering position to the stop position after releasing said actuation element;

at least one locking valve including a valve body and a tappet; and a switching piston, said switching piston being operatively fixedly connected to said mechanical actuation element, said switching piston including a plurality of cam surfaces being designed and arranged to contact said valve bodies of said inlet valve, said outlet valve and said locking valve to change the positions of said inlet valve, said outlet valve and said locking valve, said switching piston being designed and arranged to be subjected to compressed air to move said switching valve from the stop position to the driving position, said switching piston being designed and arranged to move said switching valve from the stop position to the driving position by said mechanical actuation element, said switching piston being designed and arranged to be rotated by said mechanical actuation element from the stop position in a first sense of rotation to attain the lifting position, said switching piston being designed and arranged to be rotated by said mechanical actuation element from the stop position in a second sense of rotation to attain the lowering position, said switching piston having an axis perpendicular to and spaced apart from said axis of said inlet valve to form a first distance, said axis of said switching piston perpendicular to and spaced apart from said axis of said outlet valve to form a second distance, each of said cam surfaces and said distances forming at least one lever arm for transmitting a sufficient return force and a return torque from said closing springs of said inlet valve and of said outlet valve to said switching piston to move said mechanical actuation element.

18. The switching valve of claim 17, wherein said switching piston includes a cam element being designed and arranged to protrude in a radial direction, said cam element including a first cam surface and a second cam surface being designed and arranged to actuate said inlet valve and said outlet valve, the axes of said inlet valve and of said outlet valve being arranged to be aligned.

19. The switching valve of claim 17, wherein said switching piston includes two cam elements being designed and arranged to protrude in a radial direction, said cam elements including a first cam surface and a second cam surface being designed and arranged to actuate said inlet valve and said outlet valve, the axes of said inlet valve and of said outlet valve being arranged to be parallel.

20. The switching valve of claim 17, further comprising a plurality of stop elements being designed and arranged to limit the turnability of said control piston, said cam surface for actuating said locking valve extending over a turning angle being limited by said stop elements.

* * * * *